US008525728B2

(12) United States Patent
Lundmark et al.

(10) Patent No.: US 8,525,728 B2
(45) Date of Patent: Sep. 3, 2013

(54) METHOD OF DETECTING OBJECT IN THE VICINITY OF A VEHICLE

(75) Inventors: Astrid Lundmark, Linköping (SE); Mattias Hanqvist, Stockholm (SE)

(73) Assignee: Autoliv Development AB, Värgäda (SE)

( * ) Notice: Subject to any disclaimer, the term of this patent is extended or adjusted under 35 U.S.C. 154(b) by 230 days.

(21) Appl. No.: 12/999,680

(22) PCT Filed: Jun. 25, 2008

(86) PCT No.: PCT/SE2008/050768
§ 371 (c)(1),
(2), (4) Date: Dec. 17, 2010

(87) PCT Pub. No.: WO2009/157828
PCT Pub. Date: Dec. 30, 2009

(65) Prior Publication Data
US 2011/0098892 A1  Apr. 28, 2011

(51) Int. Cl.
*G01S 5/00* (2006.01)
(52) U.S. Cl.
USPC . 342/435; 342/436; 342/539.22; 342/539.25; 342/671; 701/45; 701/96; 701/301; 701/28
(58) Field of Classification Search
None
See application file for complete search history.

(56) References Cited

U.S. PATENT DOCUMENTS

| RE37,610 E * | 3/2002 | Tsuchiya et al. | 340/435 |
|---|---|---|---|
| 7,202,776 B2 * | 4/2007 | Breed | 340/435 |
| 7,623,681 B2 * | 11/2009 | Miyahara | 382/104 |
| 7,983,802 B2 * | 7/2011 | Breed | 701/1 |
| 2002/0022927 A1 * | 2/2002 | Lemelson et al. | 701/301 |
| 2005/0111698 A1 | 5/2005 | Kawal | |
| 2005/0125126 A1 * | 6/2005 | Yopp | 701/45 |
| 2006/0095207 A1 * | 5/2006 | Reid | 701/301 |
| 2006/0153459 A1 * | 7/2006 | Zhang et al. | 382/224 |
| 2007/0147664 A1 * | 6/2007 | Kubota et al. | 382/106 |
| 2007/0282506 A1 * | 12/2007 | Breed et al. | 701/45 |
| 2008/0042812 A1 * | 2/2008 | Dunsmoir et al. | 340/435 |
| 2008/0119993 A1 * | 5/2008 | Breed | 701/46 |
| 2008/0215231 A1 * | 9/2008 | Breed | 701/117 |
| 2009/0244291 A1 * | 10/2009 | Saptharishi et al. | 348/187 |
| 2010/0007728 A1 * | 1/2010 | Strauss et al. | 348/118 |
| 2010/0097456 A1 * | 4/2010 | Zhang et al. | 348/119 |
| 2010/0289632 A1 * | 11/2010 | Seder et al. | 340/436 |
| 2010/0315215 A1 * | 12/2010 | Yuda | 340/435 |
| 2011/0001615 A1 * | 1/2011 | Kuoch et al. | 340/436 |
| 2011/0098892 A1 * | 4/2011 | Lundmark et al. | 701/45 |

FOREIGN PATENT DOCUMENTS

| EP | 1 580 075 A2 | 9/2005 |
| JP | 2005-157765 | 6/2005 |

OTHER PUBLICATIONS

PCT/SE2008/050768—International Search Report—Mar. 3, 2009.

* cited by examiner

*Primary Examiner* — Thomas Tarcza
*Assistant Examiner* — Richard Goldman
(74) *Attorney, Agent, or Firm* — Brinks Hofer Gilson & Lione

(57) ABSTRACT

A system for detecting objects in the vicinity of a vehicle, comprising: a sensor for gathering data relating to objects in the vicinity of the vehicle; and a processor operable to: detect objects, from the sensor data, based on one or more detection criteria, the detection being regulated by one or more detection parameters; analyze the detected objects; and in response to the number of detected objects, vary one or more of the detection parameters.

19 Claims, 2 Drawing Sheets

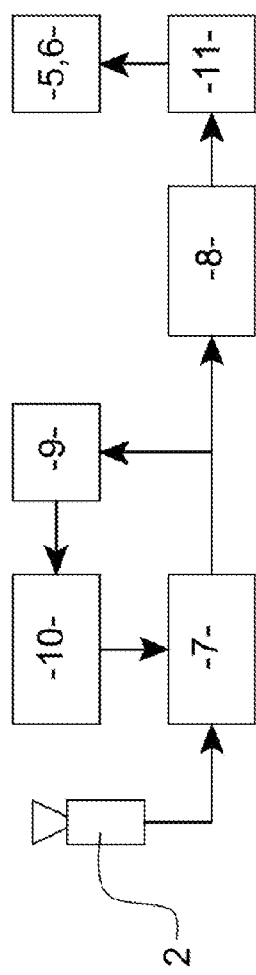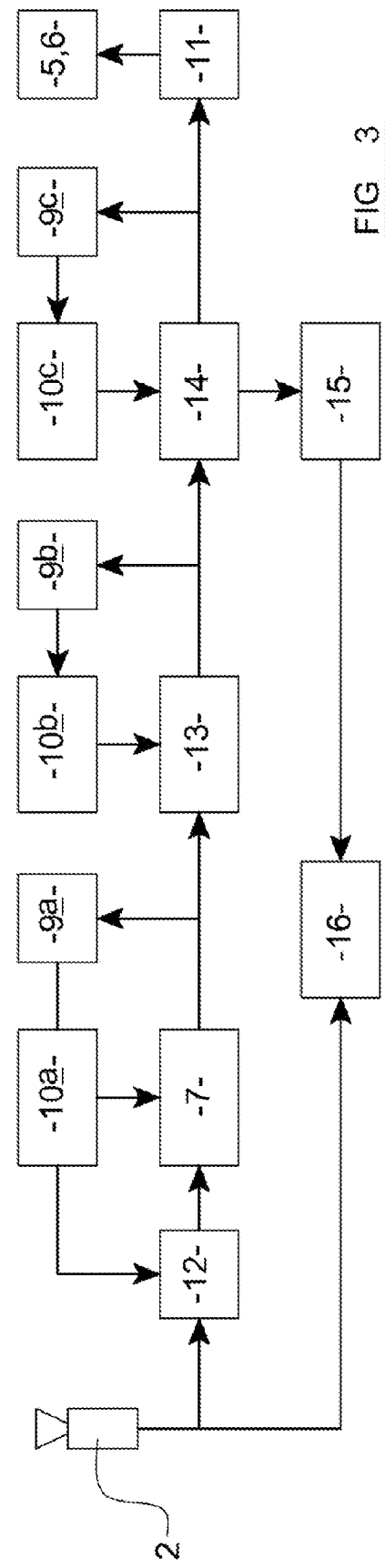

METHOD OF DETECTING OBJECT IN THE VICINITY OF A VEHICLE

CROSS REFERENCE TO RELATED APPLICATIONS

This application claims priority to PCT International Patent Application No. PCT/SE2008/050768, filed Jun. 25, 2008.

FIELD OF THE INVENTION

This invention relates to a method for detecting objects in the vicinity of a vehicle, and in particular for detecting objects which may be of importance to the safety of vehicle occupants, or to other road users.

BACKGROUND OF THE INVENTION

It is known in modern motor vehicles to provide one or more sensors which continuously provide data which can be used to detect objects in the vicinity of the vehicle. Suitable sensors include cameras (which may detect optical wavelength of light, or other wavelengths, such as infrared), ultrasonic detectors, or radar/lidar. Data from the sensors may be processed by one or more on-board vehicle processors to make determinations about objects near the vehicle. Objects of interest include other road users, for instance pedestrians, cyclists or animals, and also fixed or inanimate structures, such as lamp posts, trees and obstructions in the road.

A vehicle's on-board processors may further make a determination as to the relevance of an object, by which is meant the potential importance of the object to the driver of the vehicle. An evaluation as to the relevance of an object may be made depending on the type of the object (i.e. whether the object is human or a tree), or on the position of the object relative to the vehicle or relative to surrounding features (e.g. whether an object is on the road, on an adjacent pavement, or on a pedestrian crossing). The absolute movement of the object as well as the movement of the object relative to the vehicle, may also be taken into account when a evaluating the relevance of the object.

When an object has been classified as being relevant, its movement may be followed, and further readings will be taken with respect to the object to determine whether the relevance of the object changes. For instance, if an object is classified as being a pedestrian who is on the road ahead of the vehicle, then the relevance of the object is likely to be judged to be high. However, if the pedestrian moves to a pavement and is no longer in the path of the vehicle, the relevance of the object will be reduced.

In some vehicles, a video camera is used, and an image of the road ahead of the vehicle may be displayed to the driver. In such circumstances, objects which are classified as being relevant may be highlighted in the image which is displayed to the driver, to draw the driver's attention to the object.

It is an aim of the present invention to seek to provide an improved system of this type.

Accordingly, one aspect of the present invention provides a system for detecting objects in the vicinity of a vehicle, comprising: a sensor for gathering data relating to objects in the vicinity of the vehicle; and a processor operable to: detect objects, from the sensor data, based on one or more detection criteria, the detection being regulated by one or more detection parameters; analyse the detected objects; and in response to the number of detected objects, vary one or more of the detection parameters.

Advantageously, the sensor comprises a video camera.

Preferably, at least one of the detection parameters comprises a threshold relating to the angular size of an object appearing in data gathered by the sensor.

Conveniently, at least one detection parameter relates to the distance of the object from the vehicle.

Advantageously, at least one detection parameter relates to the contrast between the object and its background.

Preferably, at least one detection parameter relates to the position of the object with respect to the vehicle.

Conveniently, the detection parameter relates to the angular distance of a line joining the vehicle and the object from the trajectory of the vehicle.

Advantageously, at least one detection parameter relates to the type of object that is detected.

Preferably, at least one detection parameter relates to an estimated probability that the object is of a specific type.

Conveniently, at least one detection parameter relates to the application of a filter to an image or other data gathered by the sensor.

Advantageously, the application of the filter smoothes out small features in the image or other data.

Preferably, a preferred number of detections is defined for a set of data gathered by the sensor; and the at least one detection parameter is varied so that the number of detections produced using the detection parameters for a subsequent set of data is close to the preferred number.

Conveniently, the derivative of the number of detections with respect to variation of at least one of the detection parameters is determined.

Advantageously, detected objects are analysed by a classifier which is trained through analysis of a large number of known objects.

Preferably, detected objects are analysed to reach a determination as to whether the vehicle is likely to be involved in an impact with the objects.

Conveniently, if it appears that the vehicle is likely to be involved in an impact with one of the objects, a vehicle safety system is activated.

Advantageously, the system further comprises a display on which at least some data gathered by the sensor is displayed to a vehicle occupant.

Preferably, objects that are determined to be potentially relevant are highlighted in the display.

Conveniently, detected objects are classified by a classifier having two or more classification steps.

Advantageously, a first classification of the two steps is regulated by one or more classification parameters, and one or more of the classification parameters is varied in response to the number of objects classified in the first classification step.

BRIEF DESCRIPTION OF THE DRAWINGS

In order that the present invention may be more readily understood, embodiments thereof will now be described, by way of example, with reference to the accompanying figures, in which:

FIGS. 2 and 3 are schematic views of components of systems embodying the present invention.

DETAILED DESCRIPTION OF THE INVENTION

Figure 1:
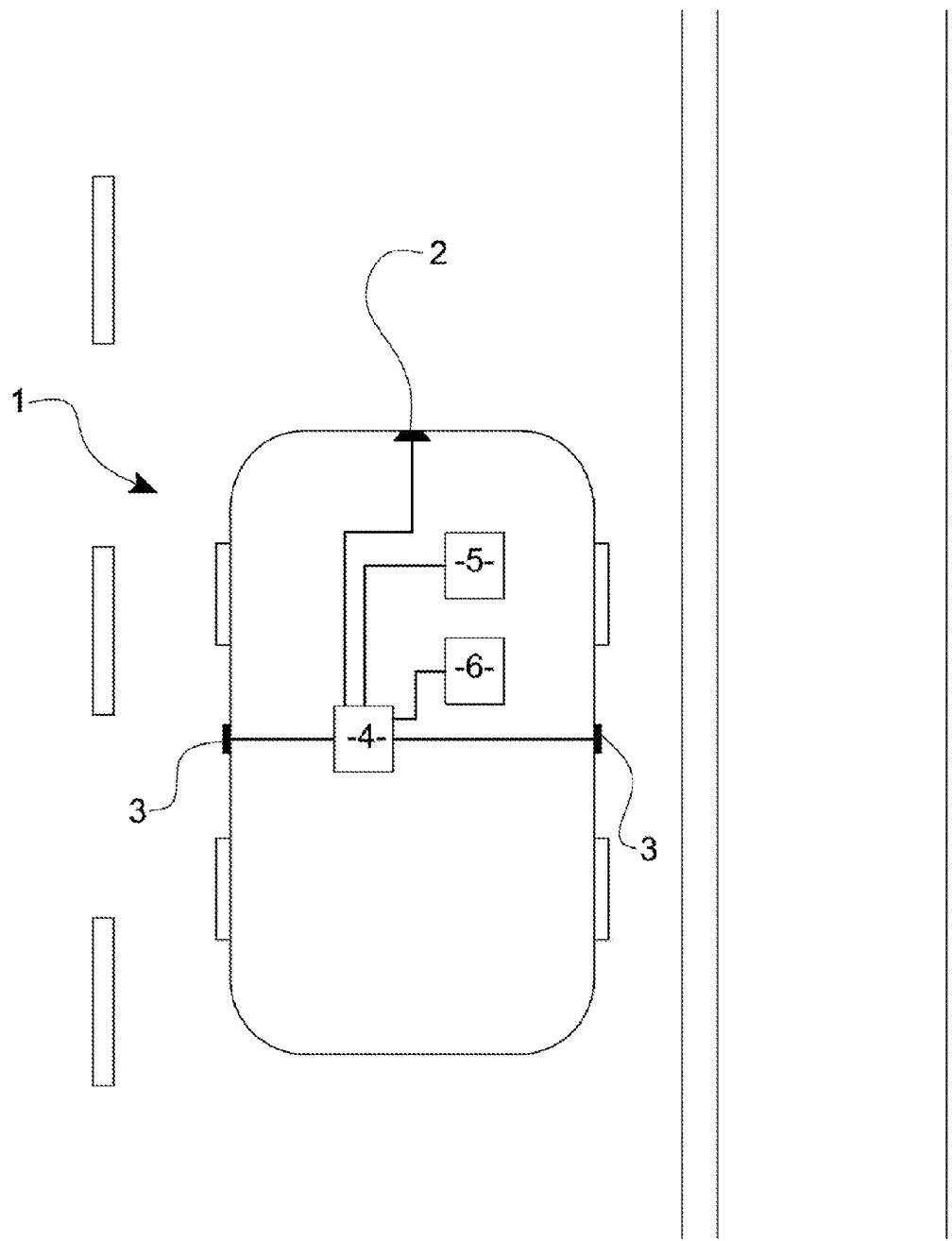
FIG. 1 is a schematic view of a vehicle including a system embodying the present invention.

Turning firstly to FIG. 1, a vehicle 1 is shown. The vehicle 1 includes a forward-facing camera 2, as well as left and right side-facing cameras 3. The front and side cameras 2 and 3 may be optical or other cameras, as discussed above, and are arranged to gather images or other readings of the surroundings of the vehicle 1.

It will be understood that any number of sensors of any appropriate type may be provided.

Outputs from the cameras 2 and 3 are fed to an on-board processor 4 (which may comprise one or more processing units). The processor 4 analyses the signals from the cameras 2 and 3. The processor 4 is operable to activate one or more vehicle safety systems, such as a driver air-bag 5 and an active seatbelt pretensioner 6 and/or a hood lifter (not shown). The invention is not, of course, limited to these vehicle safety systems.

Referring to FIG. 2, steps in the processing applied to the signals by the processor 4 are shown schematically.

The signals from the cameras 2 and 3 are first analysed to detect objects, employing one or more detection criteria, which may for example relate to the size, location, speed or type of the object. One or more detection parameters 7 are used in this analysis. The detection parameters 7 control the sensitivity with which objects appearing in images captured by the cameras 2 and 3 are detected.

One or more of the detection parameters 7 may be a threshold.

For instance, one detection parameter 7 may be how much the intensity of an object has to deviate from the intensity of the background for the object to be detected.

Another detection parameter 7 may relate to the angular size of the object in an image. At a high sensitivity, there may be no minimum angular size for an object to be detected, or the minimum angular size may be set to be low. At a lower sensitivity, only larger objects will be detected.

A further detection parameter 7 may relate to the position of an object. At a high sensitivity, any object in the vicinity of the vehicle 1 may be detected. At a low sensitivity setting, however, only objects which appear to be in or near the direct path of the vehicle 1 may be detected.

Yet a further detection parameter may relate to the absolute and relative movement of objects. At a high sensitivity setting, any objects may be detected. At a low sensitivity setting, only objects which appear to be moving towards the path of the vehicle 1 may be detected.

A skilled person will appreciate that any other types of detection parameter may be included, wherein variations of these parameters will affect the sensitivity with which objects in the vicinity of the vehicle 1 are detected.

Another detection parameter may control the application of one or more filters to the image, and the application of a filter, or the type of filter, can have a significant impact on the number of objects in the image that are detected by the processor 4. At a high sensitivity, no filter is applied, and any object in the image may be detected. At a lower sensitivity, a filter may be applied to the image, which is likely to have the effect of "smoothing out" smaller features in the image, so that only larger features will be detected.

The objects detected by the analysis using the detection parameters 7 then undergo further analysis to classify the objects using a classification parameter 8. The result of the classification may be that an object is classified as a human, an animal, a car or an uninteresting object. For instance, if a detection criterion based on the shape of the object is used, one detection parameter 7 may relate to the similarity of the object to one of a number of shape templates. If an object is sufficiently similar to one of a number of stored templates (comprising one or more typical shapes of, for instance, an adult, a child, a dog, a vehicle or a tree) then the object will be detected. If the object is not sufficiently similar to any one of the templates, then the object is not detected. This detection parameter 7 may be variable, so that the degree of similarity that is required between the shape of the object and the shape of any one of the templates may be adjusted.

Alternatively, the number of templates against which the shape of the object is compared may be varied. At a "high" sensitivity, the shape of the object could be compared against the shapes of all available stored templates. At a "low" sensitivity, the shape of the object may be compared only against the templates relating to humans.

Following this classification, one or more objects may be brought to the attention of the driver, or one or more vehicle safety systems such as airbag 5 or pretensioner 6 may be activated (for instance, if it appears that the vehicle is heading directly towards a pedestrian in the road), and the type of safety system(s) that will be activated will be understood by the skilled person.

Information relating to the number of objects detected in an image, or other set of data gathered by vehicle sensors, is also passed to a counter 9, which in turn passes information regarding the number of detected objects to a parameter adjuster 10. As with any processing system, the vehicle's processor 4 will have a limited and finite amount of processing power. The surroundings of a vehicle 1 and the number of objects that may potentially be detected can vary widely. If the vehicle 1 is being driven along a busy street, the number of objects that may potentially be detected is very high. Alternatively, if the vehicle 1 is being driven on an empty road, with flat terrain to either side of the road, then the number of objects that may potentially be detected will be much lower. In the first instance, it is likely that the processing capacity of the vehicle's processor 4 will be overwhelmed, whereas in the second instance the processing capacity will probably be under-used.

Ideally, the processing capacity of the vehicle's processor 4 that is available for analysing detected objects will be used as completely as possible, as this maximises the possibility of the most relevant objects being detected, and hence maximises the safety with which the vehicle 1 may be driven.

For the vehicle processor 4, therefore, there is an optimum number of detections that can be analysed, corresponding to approximately full use of the available processing power. The parameter adjuster 10 adjusts the detection parameters 7, taking into account the number of detections made based on a frame or other data set gathered from the cameras 2 and 3, to make the detection parameters 7 more or less sensitive. It will be understood that, if the number of detections made by the detection parameters 7 in respect of one frame is higher than the optimum number, the parameter adjuster 10 will reduce the sensitivity of the detection parameters 7. Conversely, if the number of detections is lower than the optimum number, then the parameter adjuster 10 will increase the sensitivity of the detection parameters 7. Each of these actions will tend to result in a number of detections for the next frame that is closer to the optimum number.

In preferred embodiments of the invention, if the number of detections is higher than the optimum number, the sensitivity of certain detection parameters 7 will be reduced preferentially, and if the number of detections in a subsequent frame is still above the optimum number, the sensitivity of other parameters will then be reduced. For instance, if the number of detections relating to a first frame is higher than the optimum number then, before the subsequent frame is analysed, a detection parameter relating to position may be made less sensitive, so that only objects directly in front of the vehicle 1 will be detected. The sensitivity of other parameters, for instance, relating to the type of the object, may be unchanged, as it may be considered more important to ensure that the vehicle 1 avoids any type of object directly in its path than that the vehicle tracks objects to the sides of the path in case these objects appear to move into the vehicle's path at a later stage.

Alternatively, the sensitivity of all of the parameters may be reduced simultaneously if the number of detections is above the optimum number.

A skilled person will appreciate how these principles will apply when increasing the sensitivity of the detection parameters 7, following a number of detections which is less than the optimum number.

In preferred embodiments of the invention, the parameter adjuster 10 may comprise a PID (proportional-integration-derivative) controller, that takes the measured number of detections as an input and provides adjusted detection parameters 7 as an output.

The parameter adjuster 10 may, in certain embodiments, measure the derivative of the number of detections with respect to variation of the detection parameters 7. In these embodiments, the rate of change in the number of detections with variations in the detection parameters 7 can be determined, and hence the amount by which the detection parameters 7 should be adjusted in response to the amount by which the number of detections is over or under the optimum number with respect to a specific frame can be determined accurately.

Following further analysis using a classification parameter 8 of the detected object, an impact assessor 11 identifies objects which the vehicle 1 is on course to have an impact with, or appears likely to have an impact with, and information from the impact assessor 11 is passed to the vehicle's safety devices, such as a driver air-bag 5, an active seat belt pretensioner 6, or a hood lifter, so that these systems may be activated if necessary to protect the driver or other occupants of the vehicle, or other road users.

Turning to FIG. 3, a schematic view of a further embodiment is shown in which additional steps are employed in the processing of signals.

In common with the processing steps described above, a signal, comprising a series of frames, is gathered by a camera 2 or 3. This signal is analysed using detection parameters 7 to detect potentially relevant objects within the images. The number of detected objects is determined by a first counter 9a, and this information is used by a first parameter adjuster 10a to vary the detection parameters 7, so that the number of detected objects can be controlled.

The first parameter adjuster 10a also, in this embodiment, may send a control signal to a frame rate controller 12, which controls the rate at which frames are analysed using the detection parameters 7. If the detection parameters 7 are set to a low sensitivity, but the number of objects detected is still higher than can be handled effectively by the vehicle's processor, this may signify that the vehicle 1 is in an area with a very high density of potentially relevant objects. In such a situation, the frame rate controller 12 may be instructed, for example, to pass only every second frame that is gathered by the camera 2 or 3 for analysis by the detection parameters 7. It will be understood, therefore, that approximately twice the usual length of time will be available for the vehicle's processor to analyse each of the selected frames, greatly increasing the chance of the processor being able to detect all potentially relevant objects correctly. Since most video cameras will gather between 10 and 30 frames a second, analysing only every second frame is unlikely to present a serious safety hazard.

In the example described above, the frame rate is reduced only if the detection parameters 7 have already been set to their least sensitive values. This need not be the case, however, and the rate at which frames are analysed may be reduced while maintaining a relatively high sensitivity of other detection parameters 7.

In the system shown in FIG. 3, a multi-stage classifier is used. Such multi-stage classifiers can be used to save processing power by eliminating non-interesting objects which are easily separated from interesting objects in an early classifier step, and carrying out more advanced processing in later steps where it will be more demanding to distinguish between interesting and non-interesting objects. In preferred embodiments, the object detected using the detection parameters 7 are first analysed by a first classifier 13, before being passed to a second classifier 14. In preferred embodiments of the invention, the signal from the first classifier 13 is analysed by a second counter 9b, which determines the number of classifications that have been made by the first classifier 13. This signal is then passed to a parameter adjuster 10b, which adjusts classification parameters that are employed by the first classifier 13, to control the number of classifications that are made.

A third counter 9c and a third parameter adjuster 10c are provided to control the classifications made by the second classifier 14, as will be understood by the skilled person in the art.

This may occur, for instance, if the capacity of the second classifier 14 is limited, so that the processing power allocated to the second classifier 14 is used as fully as possible.

Also, the second classifier 14 may operate with controlled classification parameters, thereby avoiding overloading of the impact assessor 11.

When the different processing steps share the same physical hardware, a combined control algorithm may be utilised to optimise the parameters of each of these processing steps simultaneously, for optional system performance.

As in the previous example, the signal from the second classifier 14 will be passed to an impact assessor 11, which in turn will send control signals to vehicle safety systems such as a driver air-bag 5, an active seat belt pretensioner 6, or a hood lifter.

Further, the signal from the second classifier 14 (or, if only one classifier is used, from that classifier) may be passed to a highlighting creator 15, which creates one or more types of highlights which can be presented to a driver of the vehicle to accentuate objects that are of potential relevance. The signal both from the camera 2 and the highlight creator 15 are passed to a display 16, which is displayed to a driver of the vehicle in such a way that the highlights created by the highlight creator 15 overlay, or otherwise draw attention to, the potentially most relevant objects that can be seen in the display 16 that have been determined to be of greatest relevance.

Certain existing techniques detect objects according to fixed criteria, and subsequently sort through the detections to determine the most relevant. Clearly, this requires excessive computational power, and is unsuitable when the number of detectable objects in the vicinity of the vehicle is high. Other techniques involve the detection of objects according to fixed criteria, with these detections then being processed in turn. When the time available for processing the detections expires (i.e. when the next frame is received from the sensors), any detections which have not been processed are discarded. Clearly, this technique risks the discarding of the most relevant detections. Still further techniques involve detecting objects based on fixed criteria which are calibrated for a "worst case scenario", where there is a very large number of detectable objects. It will be appreciated, however, that this strategy is not optimal in cases where there is not a high number of detectable objects in the vicinity of the vehicle.

It will be appreciated that embodiments of the present invention allow effective use of a vehicle's hardware resources, without discarding important data which may potentially be important to the safety of vehicle occupants or other road users.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the above description constitutes the preferred embodiment of the present invention, it will be appreciated that the invention is susceptible to modification, variation, and change without departing from the proper scope and fair meaning of the accompanying claims.

The invention claimed is:

1. A system for detecting objects in the vicinity of a vehicle, comprising:
    a sensor for gathering data relating to the objects in the vicinity of the vehicle; and
    a processor configured to:
        detect the objects from the data from the sensor, based on one or more detection criteria, the detection criteria being regulated by one or more detection parameters;
        define a preferred number of detected objects for a set of the data gathered by the sensor, the preferred number approximately corresponding to a maximum number of objects analyzable within a processing cycle;
        analyze the detected objects and the number of the detected objects; and
        in response to the number of the objects detected, make an adjustment of at least one of the number of the one or more detection parameters, and a property of at least one of the one or more of the detection parameters, the adjustment altering the number of the objects detected by applying the varied one or more detection parameters to a number close to the preferred number for a subsequent set of data.

2. A system according to claim 1, wherein the sensor comprises a video camera.

3. A system according to claim 1, wherein at least one of the detection parameters comprises a threshold relating to the angular size of the objects appearing in the data gathered from the sensor.

4. A system according to claim 1, wherein at least one of the detection parameters relates to the distances of the objects from the vehicle.

5. A system according to claim 1, wherein at least one of the detection parameter relates to the contrast between the objects and a background.

6. A system according to claim 1, wherein at least one of the detection parameter relates to the positions of the objects with respect to the vehicle.

7. A system according to claim 6, wherein the at least one detection parameter relates to an angular distance of a respective line joining the vehicle and each of the objects from the trajectory of the vehicle.

8. A system according to claim 1, wherein the at least one detection parameter relates to at least one type of the detected objects.

9. A system according to claim 1, wherein the at least one detection parameter relates to an estimated probability that each of the objects is of a specific type.

10. A system according to claim 1, wherein the at least one detection parameter relates to the application of a filter to an image or other of the data gathered by the sensor.

11. A system according to claim 10, wherein the application of the filter smoothes out small features in the image or other of the data.

12. A system according to claim 1, wherein a rate of change of the number of the detected objects with respect to variation of at least one of the detection parameters is determined.

13. A system according to claim 1, wherein the detected objects are analyzed by a classifier which is trained through analysis of a large number of known types of the objects.

14. A system according to claim 1, wherein the detected objects are analyzed to reach a determination as to whether the vehicle is likely to be involved in an impact with the objects.

15. A system according to claim 14 wherein, if it appears that the vehicle is likely to be involved in an impact with one of the objects, a vehicle safety system is activated.

16. A system according to claim 1, further comprising a display on which at least some of the data gathered by the sensor is displayed to a vehicle occupant.

17. A system according to claim 16, wherein such objects that are determined to be potentially relevant are highlighted in the display.

18. A system according to any claim 1, wherein the detected objects are classified by a classifier having two or more classification steps.

19. A system according to claim 18, wherein a first classification of the two or more classification steps is regulated by one or more classification parameters, and the one or more of the classification parameters is varied in response to the number of the objects classified in the first classification step.

* * * * *